United States Patent [19]
Hennick

[11] Patent Number: 5,838,495
[45] Date of Patent: Nov. 17, 1998

[54] IMAGE SENSOR CONTAINMENT SYSTEM

[75] Inventor: Robert J. Hennick, Auburn, N.Y.

[73] Assignee: Welch Allyn, Inc., Skaneateles Falls, N.Y.

[21] Appl. No.: 620,909

[22] Filed: Mar. 25, 1996

[51] Int. Cl.⁶ ................................................. G02B 7/00
[52] U.S. Cl. ........................................................ 359/507
[58] Field of Search ................................ 359/507, 513, 359/514

[56] References Cited

U.S. PATENT DOCUMENTS

| | | | |
|---|---|---|---|
| 3,194,364 | 7/1965 | Kolm | 189/64 |
| 4,245,652 | 1/1981 | Kelly et al. | 128/736 |
| 4,991,949 | 2/1991 | Moorehead | 359/513 |
| 5,210,406 | 5/1993 | Beran et al. | 250/221 |
| 5,299,060 | 3/1994 | Mori et al. | 359/514 |
| 5,550,675 | 8/1996 | Komatsu | 359/514 |

*Primary Examiner*—Thong Nguyen
*Assistant Examiner*—Mark A. Robinson
*Attorney, Agent, or Firm*—Wall Marjama & Bilinski

[57] ABSTRACT

A containment system for containing an image sensor. The containment system includes a substrate for carrying an image sensor, an optics housing disposed about the image sensor and secured to the substrate, and a foam barrier interposed between the housing and the image sensor or between the optics housing and the substrate. The foam barrier of the containment system prevents the intrusion of particulate and stray light rays into the containment interior. Further, the foam barrier traps particulate so as to inhibit the free circulation of particulate in the region surrounding the containment system. Because it allows for a circulation of air into and out of the containment system, the foam barrier encourages the evaporation of condensate which may form on the contained image sensor and/or optical lens components.

10 Claims, 2 Drawing Sheets

IMAGE SENSOR CONTAINMENT SYSTEM

FIELD OF THE INVENTION

The present invention relates generally to a containment system for an image sensor, and particularly to an image sensor containment system comprising a foam barrier.

BACKGROUND OF THE PRIOR ART

Image sensors comprise a linear array or a matrix of photosensitive picture elements (pixels). Certain types of image sensors commonly used in symbology decoding applications have relatively low resolution. One common type of image sensor has a resolution of about 1.3 bars per pixel for a widely used bar code symbol bar width. Thus, the failure of a single pixel in the image sensor could prevent the sensor from being used to capture certain bar code symbology indicia.

Several factors can negatively affect the performance of an image sensor. The performance of an image sensor can be negatively impacted by dust, dirt, debris, or moisture impinging on the glass protective covering of an image sensor, and/or optical lens components. Image sensor performance can also be negatively impacted by stray light rays contacting the image sensor.

Most image sensors are fixed to a printed circuit board (PCB) or to a holder which is fixed to the PCB, or other wise in electrical communication with image processing hardware. An optics housing comprising a lens assembly for focusing light onto the image sensor is positioned over the image sensor and is mounted to the PCB or to the holder. In addition to holding a lens assembly at a predetermined position from the image sensor, the optics housing partially forms a containment system for the image sensor.

One type of containment system, consists entirely of an optics housing disposed about an image sensor carried by a PCB. In this the optics housing is disposed about the image sensor and is bolted directly to the PCB carrying the image sensor. In this type of containment system, the optics housing does not uniformly abut the PCB and consequently, gaps are formed between the optics housing and the PCB at the interface therebetween. Dust, dirt, and debris can enter the containment through these gaps to interfere with image sensor operation. Moreover, stray light rays can enter into the containment through the gaps to alter functioning of the pixel array or matrix.

In another type of containment system, a rubber O-ring is interposed between an optics housing and the substrate to which the optics housing is secured. Such a containment system is effective in preventing the intrusion of dust, dirt, and debris into the containment interior, and is effective in preventing stray light from negatively impacting operation of the image sensor.

However, with a rubber O-ring type containment system, particulate matter that is prevented from entering the containment can circulate in the equipment article which houses the containment system and can thereby invade and disrupt the functioning of other sensitive components of the equipment article. In addition, the image sensor, and/or optical lens components of a rubber O-ring type containment system are susceptible to moisture buildup.

When an equipment article having an O-ring type image sensor containment system is transported from a cold temperature environment to a warm temperature environment, condensate is likely to form on the glass protective coating of the image sensor and/or optical lens components. Because the rubber O-ring provides an airtight seal between the optics housing and the substrate, the condensate will not easily evaporate and therefore will potentially disrupt image sensor operation.

There exists a need for an image sensor containment system which, in addition to preventing the intrusion of particulate matter and stray light rays into the containment, impedes the free circulation of particulate about an equipment article housing, and deters the buildup of moisture on the contained image sensor and/or optical lens components.

SUMMARY OF THE INVENTION

According to its major aspects as broadly stated, the present invention is an improved containment system for an image sensor.

The containment system comprises a substrate, which may be provided by a PCB or an image sensor holder fixed to a PCB, and an optics holder which, in addition to partially forming a containment system for an image sensor, positions a lens assembly in a strategic position so as to focus light on the image sensor according to a predetermined optical system design. A containment system according to the present invention further includes a foam barrier interposed between the substrate and the optics housing.

The foam barrier prevents the intrusion of particulate matter (which may comprise dust, dirt, or debris particulate) and prevents the intrusion of stray light rays into the containment. In addition, the foam barrier traps particulate matter and thereby impedes the free circulation of particulate within the containment. Furthermore, as a breathable material, the foam barrier allows air to circulate into and out of the containment. Thereby, the foam barrier encourages evaporation of condensate that has formed on a contained image sensor and/or optical lens components.

BRIEF DESCRIPTION OF THE DRAWINGS

In the Drawings, wherein like numerals are used to indicate the same elements throughout the views.

DETAILED DESCRIPTION OF THE PREFERRED EMBODIMENTS

Figure 1:
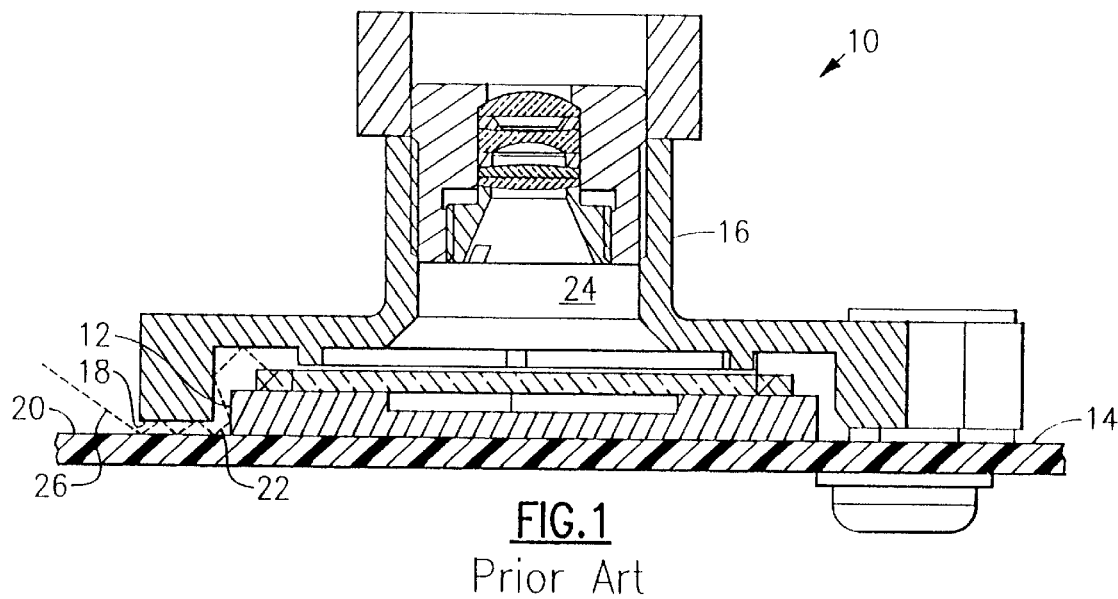
FIG. 1 is a cross-sectional side view of a prior art containment system wherein an optics housing is abutted directly against a housing.

It will be helpful in understanding the present invention to review a conventional system for containing an image sensor. In conventional containment system 10 of FIG. 1, image sensor 12 is mounted to a printed circuit board (PCB) 14. An optics housing 16 is then fitted over image sensor 12 and attached directly to PCB 14. Because edge 18 of optics housing 16 and surface 20 of PCB will not be perfectly flat, gaps, as indicated by gap 22 will be formed between housing 16 and PCB 20 along the interface therebetween. Particulate, including dust, dirt and debris may find its way through gap 22 and into the containment interior 24. Stray light rays, as indicated by 26 may also enter gap 22 to interfere with the operation of image sensor 12.

Figure 2:
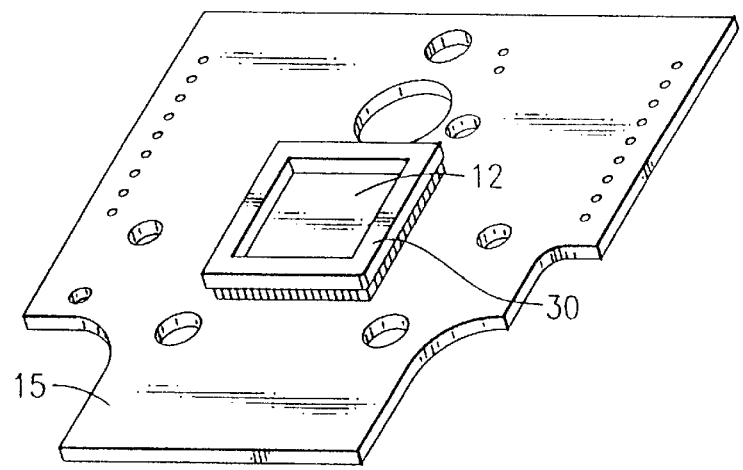
FIG. 2 is a perspective view showing a matrix type image sensor fixed to a substrate having disposed thereon a foam barrier for use in a containment system according to the invention.
Figure 3:
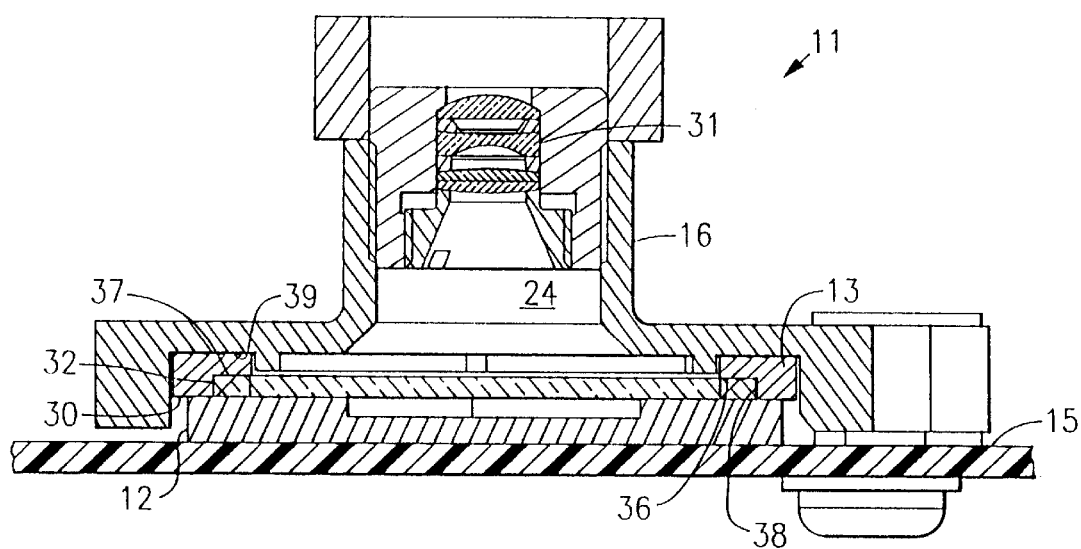
FIG. 3 is a cross-sectional side view of a containment system according to the invention.

A containment system according to the present invention is described with reference to FIGS. 2 and 3. In the present invention, as in the prior art containment system, an image sensor 12 is mounted to a substrate 15. The image sensor contained by the containment system of the present invention may be a visible light or infrared (IR) type image sensor in a linear or matrix array in one of various available technologies including CCD, CMOS, NMOS, PMOS, CID, and CMD, technologies. Substrate 15 is shown in FIGS. 1 and 2 as being provided by a PCB, but may also be provided by an image sensor carrier (not shown) which is attached to a PCB or is otherwise in electrical communication with associated image processing hardware.

In making the present invention, foam barrier 30 is disposed on or about image sensor 12. In general, foam barrier 30 should normally be substantially uniform in thickness and should be ring-shaped. Once foam barrier 30 is positioned on or about image sensor 12, housing 16, which positions optical lens components lens 31 in a certain position in relation to image sensor 12, is disposed about image sensor 12 so that an interior surface 32 of housing 16 receives foam barrier 30. When optics housing 16 is secured to substrate 15, foam barrier 30 is compressed slightly and is pressed against image sensor 12. Preferably, foam barrier 30 has an L-shaped cross-section as indicated in FIG. 3. Foam barrier 30 may be preformed to have an L-Shaped cross-section, or may take on an L-Shaped cross-section when installed. Lateral surface 36 of foam barrier 30 contacts the top surface 37 of image sensor 12 about the periphery thereof (and is spaced apart from an active region of the sensor) while lip surface 38 contacts an upper side edge 39 of image sensor 12 about the perimeter thereof. Foam barrier 30 may also be interposed between optics housing 16 and substrate 15 without contacting image sensor, or may be made to contact substrate 15, image sensor 12 and housing 16 simultaneously.

Foam barrier 30 should be made of disintegration-resistant foam and should have a low density of less than about 5 lb/ft$^3$. "Foam" shall herein refer to any rigid or flexible material having pores, channels, or holes, formed therein or which is otherwise adapted to be breathable to allow the passage of air therethrough, and which is also adapted to prevent the advance of at least some particulate matter from one side thereof to another. A preferred foam for use in the present invention is ⅛ inch series 4318 foam tape of the type manufactured by Minnesota Mining and Manufacturing Co., of St. Paul, Minn. This type of foam is low density (about 2 lb/ft$^3$) and comprises open cell flame retardant polyester-polyurethane. Using low density foam to implement the present invention, as opposed to high density foam, provides two major advantages. First, it reduces the securing force required to attach optics housing 16 to substrate, and therefore reduces the strength requirements, size requirements, and cost of substrate 15. Second, as will be discussed in greater detail below, low density foam encourages substantial circulation of air into and out of containment interior 24.

Foam barrier 30 of containment system 11 prevents the intrusion of particulate and stray light rays into containment interior 24, either of which could possibly disrupt functioning of image sensor 12. Foam barrier 30 does not simply stop the advance of dust, dirt, or debris particulate into containment interior 24; it also traps the particulate, which otherwise might freely circulate within an equipment article and negatively impact other sensitive components of the equipment article.

Furthermore, air can flow through the pores of foam barrier 30. Therefore, a substantial circulation of air into and out of containment 11 is encouraged. A circulation of air into and out of containment interior 24 impedes the buildup of moisture on image sensor glass covering 13 and optical lens components 31. When an equipment article is transported from a cold environment to a warm environment, condensate will likely form on glass covering 13 of image sensor and/or optical lens components 31. With foam barrier 30, air will circulate in containment interior 24 to cause evaporation of the condensate and moisture buildup will not negatively impact performance of image sensor 12 and/or optical lens components 31.

While the invention has been described in detail with reference to a single preferred embodiment, it should be apparent that many modifications and variations would present themselves to those skilled in the art without departing from the scope and spirit of this invention, as defined in the appended claims.

What is claimed is:

1. In an optical reading apparatus of the type including an integrated circuit image sensor having an array of picture elements, a substrate for supporting said image sensor, an optics housing for protecting said image sensor from ambient light and for supporting a lens assembly in light focusing relationship to said array, and means for securing said image sensor and said optics housing to said substrate, at least two of said image sensor, said optics housing and said substrate together defining an opening through which air may circulate between the atmosphere and the interior of said optics housing, the improvement comprising:

a compressible barrier member which, when disposed in said opening, defines a multiplicity of pores having sizes which allow substantially particulate-free air to circulate between said interior and the atmosphere, but which filters out and traps particulates suspended in said air.

2. A reading apparatus as set forth in claim 1 in which said image sensor has an upper surface, and in which said barrier member is disposed between said upper surface and said optics housing and makes contact with said upper surface along the entire periphery thereof.

3. A reading apparatus as set forth in claim 1 in which said optics housing has a lower surface, and in which said barrier member is disposed between said lower surface and said substrate and makes contact with said lower surface along the entire periphery thereof.

4. A reading apparatus as set forth in claim 1 in which said image sensor has a generally horizontally disposed upper surface and at least one generally vertically disposed side surface, and in which said barrier member is disposed between said optics housing and said upper and said at least one side surface of said image sensor.

5. A reading apparatus as set forth in claim 2 in which said horizontally disposed upper surface and said at least one vertically disposed side surface define a step that extends around the entire periphery of said image-sensor, and in which said barrier member makes contact with said step along the entire periphery thereof.

6. A reading apparatus as set forth in claim 1 wherein said compressible barrier member comprises a foam material.

7. A reading apparatus as set forth in claim 6 in which said foam material has a density less than about 5 lb/ft$^3$.

8. A reading apparatus as set forth in claim 6 in which said foam material has a density less than about 2 lb/ft$^3$.

9. A reading apparatus as set forth in claim 6 in which said foam material comprises polyester-polyurethane.

10. A reading apparatus as set forth in claim 6 in which said barrier member comprises a piece of open cell polyester-polyurethane foam having a density of about 2 lb/ft$^3$.

* * * * *